M. LEITCH.
MILKING MACHINE.
APPLICATION FILED NOV. 18, 1915.

1,196,001.

Patented Aug. 29, 1916
2 SHEETS—SHEET 1.

WITNESS:

INVENTOR
Meredith Leitch
BY
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE.

1,196,001.  Specification of Letters Patent.  Patented Aug. 29, 1916.

Application filed November 18, 1915. Serial No. 62,119.

*To all whom it may concern:*

Be it known that I, MEREDITH LEITCH, a citizen of the United States, residing at Poughkeepsie, county of Dutchess and State of New York, have invented a new and useful Improvement in Milking-Machines, of which the following is a full, clear, and exact description, reference being had to the accompanying drawings, which form a part of this specification.

It is known, in milking machines, to provide means to compress two of the teats while pressure upon the other two is released and alternately therewith to release the pressure upon the first-named teats and apply pressure to the other two teats. For example, this has been effected, in double chamber teat cups, by pneumatic means in the von Bechtolsheim Patent No. 678,231, dated July 9, 1901; while a British patent to the same inventor, No. 2661 of 1899 shows similar mechanism in connection with continuous suction in the inner teat cup chamber.

The object of my invention is to effect the same result, that is, pneumatic pulsations acting alternately upon two pairs of teats and continuous suction (with or without intermittent admission of air) in the milk discharge from all the teat cups, by means of a single pipe line through which a master valve actuates a secondary valve controlling the pneumatic pulsations in the outer teat cup chamber.

Another object of the invention is to exhaust air from the pulsation chambers of the teat cups without passing the same into the milk discharge or the pail.

Figure 1:
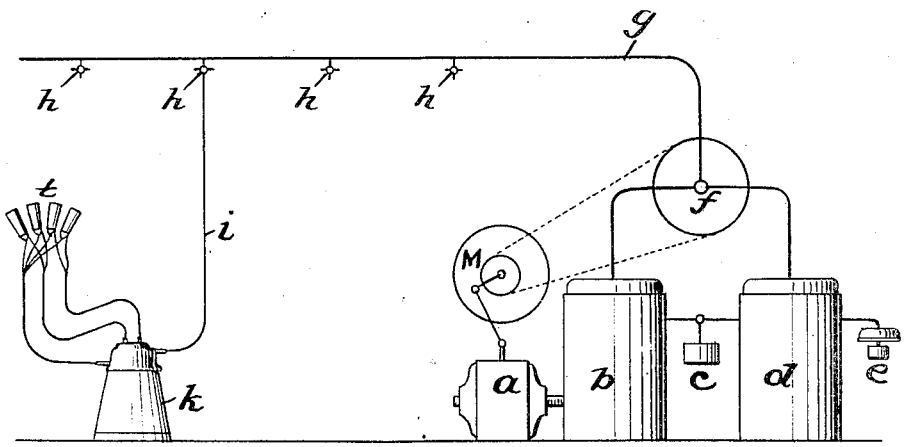
Figure 2:
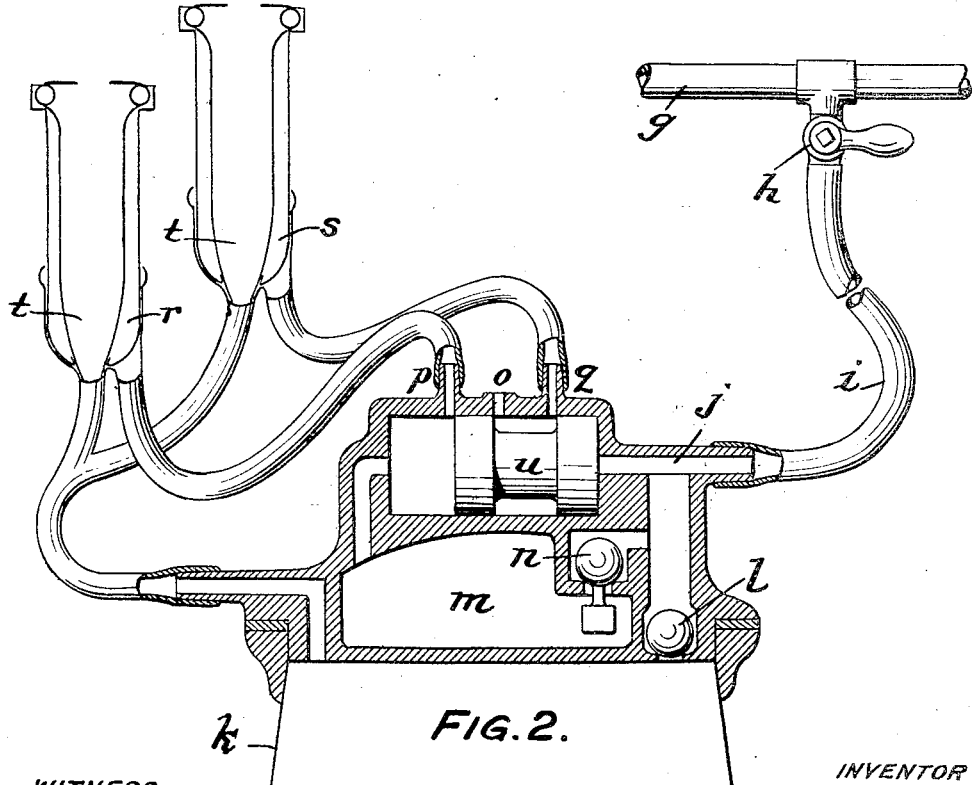
Figure 3:
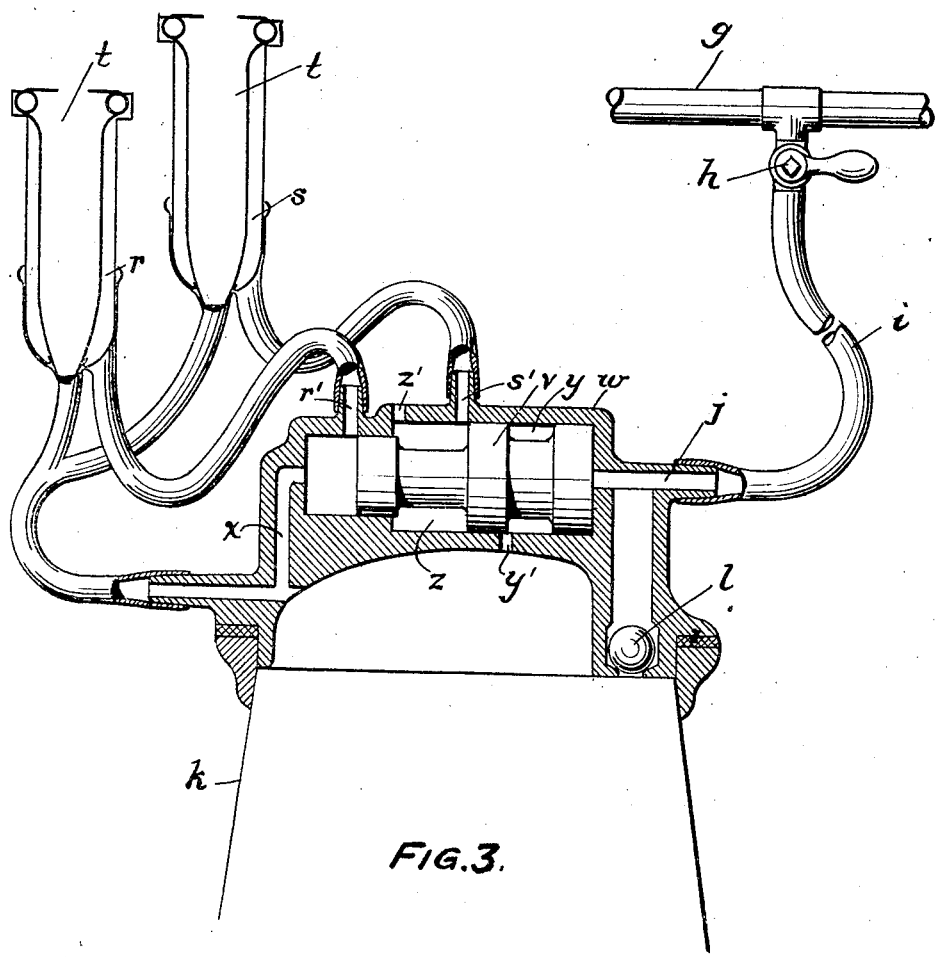

In the accompanying drawings: Figure 1 is a diagrammatic view of a complete installation. Fig. 2 is a vertical sectional view of one unit, showing the secondary valve and two teat cups, one of each pair. Fig. 3 is a view, similar to Fig. 2 of a modification.

A vacuum pump $a$ exhausts air from a high vacuum tank $b$, which is connected with a low vacuum tank $d$ through a pipe controlled by an automatic pressure-reducing valve $c$ adapted to permit air to flow from the low vacuum tank $d$ to the high vacuum tank $b$ when the difference in pressure is greater than is desired. An automatic vacuum relief valve $e$ admits air to the low vacuum tank $d$ when the vacuum therein becomes higher than is desired.

A valve $f$, that may be operated from the same motor M that drives the vacuum pump $a$, connects a stanchion pipe line $g$ with the tanks $b$ and $d$ alternately. The stanchion pipe line $g$ is provided, at convenient points, with cocks $h$ for the attachment of a flexible pipe $i$ which is connected with the passage $j$ in the cover of the milk pail $k$. A check valve $l$ provides communication between the interior of the pail and the passage $j$.

In the pail cover is a chamber $m$ communicating through a loaded check valve $n$ with the passage $j$. The pulsator consists of a two-headed piston $u$ in a cylinder having free communication at one end with passage $j$ and at the other end with the chamber $m$ and having three ports $o$, $p$ and $q$. The port $o$ is open to the atmosphere, the port $p$ communicates with the inflation chambers $r$ of two teat cups and the port $q$ with the inflation chambers $s$ of the other two teat cups. The teat chambers $t$ of all the cups are connected by flexible tubes with the pail $k$.

In operation the pump $a$ exhausts air from the reservoir $b$ and, through the reducing valve $c$, from the reservoir $d$. The valve $c$ is adjusted to maintain a uniform difference in pressure between the two tanks. When the vacuum in the tank $d$ exceeds the desired value, the safety valve $e$ opens and admits air. The valve $f$ connects the pipe line $g$ with the tanks $b$ and $d$ alternately, thus causing a pulsating vacuum in the pipe line. In practice I have found that if the vacuums in the tanks $b$ and $d$ are maintained at 15″ and 11″ of mercury, efficient work will be done; but other values may be used if desired. When the pipe $i$ is connected to pipe $g$, air is exhausted from the pail $k$, from the interior of the teat cups, and from the chamber $m$. The check valve $l$ is so light that it opens easily during the high vacuum wave and hence causes the vacuum in the pail and the connected teat cups to approximate the highest in the pipe line $g$. The check valve $n$ is loaded so that to lift it requires a difference in vacuum between the passage $j$ and the chamber $m$ equal to about half the amplitude of the pulsation in the pipe $g$. At the time of the high vacuum in the passage $j$, the pressure in the chamber $m$ will be greater than in the passage $j$, and the piston valve will move to the right as shown in Fig. 2. Air will now pass through the ports $o$ and $q$, fill the inflater space $s$ and squeeze the teat in that cup. At the same time air will be exhausted from the inflater space $r$ through the port $p$, the pulsator cylinder, the chamber $m$, the check valve $n$ and the passage $j$. When the low vacuum pulsation occurs in passage $j$, the pressure will be higher than in the chamber $m$ and the piston will be forced to the left. Air will now be exhausted from the inflater $s$ through the port $q$, the pulsator cylinder and the passage $j$, while air will enter the inflater $r$ through the ports $o$ and $p$. It will thus be seen that by the provision of a single pipe line in which vacuum waves are produced, all the teats are subjected to continuous suction, and the pneumatic compression of two teats while allowing the other two to dilate and alternately therewith dilating the first two teats while compressing the last two, is effected by the interposition of but a single, simply constructed valve.

In the aforedescribed embodiment of my invention, the degree of vacuum in the outer teat cup chambers is somewhat lower than in the inner teat cup chambers, while the vacuum in the inflater $s$ is somewhat lower than in the inflater $t$. If it is desired to have the vacuum in the inflaters of all the teat cups approximately equal that in the teat cup chambers, the apparatus may be modified as shown in Fig. 3. In this modification the passage $j$ and check valve $l$ are retained, the chamber $m$ is omitted, and for the valve $u$ is substituted a differential piston $v$ working in a cylinder $w$ of two diameters. The small diameter end of the piston is in constant communication, through passage $x$, with the interior of the pail $k$. The large diameter end of the piston is in constant communication with the passage $j$. The piston is cut away between both ends and the center, forming an annular space $y$, which is in constant communication, through a port $y'$, with the interior of the pail, and an annular differential space $z$ which is in constant communication, through a port $z'$ with the atmosphere. The inflater space $r$ is connected to a port $r'$ in the small diameter end of the cylinder, while the inflater space $s$ is connected to a port $s'$ in the large diameter part of the cylinder.

During the high vacuum wave, the pressure against the large end of piston $v$ is the same as that against the small end thereof, but atmospheric pressure on the differential area of the middle part of the piston moves the piston to the right, as shown in Fig. 3. This movement of the piston connects the inflater space $s$, through port $s'$ and space $z$, with the air port $z'$, and the inflater space $r$, through port $r'$, the small end of the cylinder and passage $x$, with the high degree vacuum in the pail. During the low vacuum wave, the pressure against the large end of the piston overcomes the lower pressure against the small end thereof and the atmospheric pressure against the differential area of the middle part of the piston, and forces the piston to the left. This movement of the piston connects the inflater $s$, through port $s'$, with the high vacuum space $y$ and connects the inflater $r$, through port $r'$, with the air space $z$. Thus, the same results are accomplished as in the form shown in Fig. 2, except that the vacuum in one pair or the other of the inflaters is of substantially the same degree as in the milk pail and except that the exhaust from the pulsation chambers of the teat cups is through the pail instead of independently thereof.

While it is of decided advantage to control the operation of the secondary valve and the application of a squeezing pressure to the two pairs of teats alternately, by means of vacuum waves (by which I mean alternations of high and low vacuum), the invention is not limited to production in the single pipe line of this type of pneumatic pulsations except where the same is specifically claimed.

While in the claims I refer, for the sake of simplicity, to only two teat cups, it will be understood that I intend more especially to cover a construction wherein each of these two cups is one of a pair.

Having now fully described my invention, what I claim and desire to protect by Letters Patent is:

1. In a milking machine, the combination with two double-chambered teat cups, of a pipe line, means to produce pneumatic pulsations therein, and means controllable by said pneumatic pulsations to communicate suction to the inner chambers of the teat cups and to create pneumatic pulsations in the outer chambers of the two teat cups alternately.

2. In a milking machine, the combination with two double-chambered teat cups, of a pipe line, means to produce pneumatic pulsations therein, and means controllable by said penumatic pulsations to communicate suction to the inner chambers of the teat cups and to admit air to the inflation chamber of one cup while exhausting air from the inflation chamber of the other and vice versa.

3. In a milking machine, the combination with two double chambered teat cups, of a pipe line, means to produce vacuum waves therein, and means controllable by said vacuum waves to communicate suction to the inner chambers of the teat cups and to create pneumatic pulsations in the outer chambers of the two teat cups alternately.

4. In a milking machine, the combination with two double chambered teat cups, of a pipe line, means to produce alternate high and low vacuum waves therein and to communicate suction to the inner chambers of the teat cups, a valve the operation of which is controlled by said vacuum waves, and ports and passages coöperating with said valve to communicate pneumatic pulsations to the outer chambers of the two teat cups alternately.

5. In a milking machine, the combination with two double-chambered teat cups, of a pipe line, means to produce vacuum waves therein, and means controllable by said vacuum waves to communicate suction to the inner chambers of the teat cups and to admit air to the inflation chamber of one teat cup while exhausting air from the inflation chamber of the other and vice versa.

6. In a milking machine, the combination with two double-chambered teat cups, of a pipe line, means to produce alternate high and low vacuum waves therein and to communicate suction to the inner chambers of the teat cups, a valve the operation of which is controlled by said vacuum waves, and ports and passages coöperating with said valve to admit air to the inflation chamber of one teat cup while exhausting air from the inflation chamber of the other and vice versa.

7. In a milking machine, the combination with two double-chambered teat cups, of a pipe line, means to produce pneumatic pulsations therein, a milk discharge connected with the inner teat cup chambers, a check valve between the pipe line and the milk discharge whereby continuous suction is produced in the milk discharge, and means controlled by the pneumatic pulsations in the pipe line to communicate pneumatic pulsations to the two teat cups alternately.

8. In a milking machine, the combination with two double-chambered teat cups, of a pipe line, means to produce pneumatic pulsations therein, a milk discharge connected with the inner teat cup chambers, a check valve between the pipe line and the milk discharge whereby continuous suction is produced in the milk discharge, a valve connected with the pipe line and whose operation is controlled by said pneumatic pulsations, and ports and passages coöperating with said valve to communicate pneumatic pulsations to the two teat cups alternately.

9. In a milking machine, the combination with two double-chambered teat cups, of a pipe line, means to produce vacuum waves therein, a milk discharge connected with the inner teat cup chambers, a check valve between the pipe line and the milk discharge whereby continuous suction is produced in the milk discharge, and means controlled by the vacuum waves in the pipe line to communicate pneumatic pulsations to the two teat cups alternately.

10. In a milking machine, the combination with two double-chambered teat cups, of a pipe line, means to produce vacuum waves therein, a milk discharge connected with the inner teat cup chambers, a check valve between the pipe line and the milk discharge whereby continuous suction is produced in the milk discharge, a valve connected with the pipe line and whose operation is controlled by said vacuum waves, and ports and passages coöperating with said valve to communicate pneumatic pulsations to the two teat cups alternately.

11. In a milking machine, the combination with two double-chambered teat cups, of a pipe line, means to produce pneumatic pulsations therein, a milk discharge connected with the inner teat cup chambers, a check valve between the pipe line and the milk discharge whereby continuous suction is produced in the milk discharge, and means controlled by the pneumatic pulsations in the pipe line to admit air to the inflation chamber of one teat cup while exhausting air from the inflation chamber of the other teat cup and vice versa.

12. In a milking machine, the combination with two double-chambered teat cups, of a pipe line, means to produce pneumatic pulsations therein, a milk discharge connected with the inner teat cup chambers, a check valve between the pipe line and the milk discharge whereby continuous suction is produced in the milk discharge, a valve connected with the pipe line and whose operation is controlled by said pneumatic pulsations, and ports and passages coöperating with said valve to admit air to the inflation chamber of one teat cup while exhausting air from the inflation chamber of the other teat cup and vice versa.

13. In a milking machine, the combination with two double chambered teat cups, of a pipe line, means to produce vacuum waves therein, a milk discharge connected with the inner teat cup chambers, a check valve between the pipe line and the milk discharge whereby continuous suction is produced in the milk discharge, and means controlled by the vacuum waves in the pipe line to admit air to the inflation chamber of one teat cup while exhausting air from the inflation chamber of the other teat cup and vice versa.

14. In a milking machine, the combination with two double-chambered teat cups, of a pipe line, means to produce vacuum waves therein, a milk discharge connected with the inner teat cup chambers, a check valve between the pipe line and the milk discharge whereby continuous suction is produced in the milk discharge, a valve connected with the pipe line and whose operation is controlled by said vacuum waves, and ports and passages coöperating with said valve to admit air to the inflation chamber of one teat cup while exhausting air from the inflation chamber of the other teat cup and vice versa.

15. In a milking machine, the combination with two double chambered teat cups, of a pipe line, means to produce pneumatic pulsations therein, a milk discharge connected with the inner teat cup chambers, a check valve between the pipe line and the milk discharge whereby continuous suction is produced in the milk discharge, a valve chamber having an air port and two other ports, and pipes connecting the latter two ports with the inflaters of the respective teat cups, said valve being operable by said pneumatic pulsations to connect the air port alternately with the other two ports and to connect the last named two ports alternately with a partial vacuum.

16. In a milking machine, the combination with two double-chambered teat cups, of a pipe line, means to produce vacuum waves therein, a milk discharge connected with the inner teat cup chambers, a check valve between the pipe line and the milk discharge whereby continuous suction is produced in the milk discharge, a valve chamber having an air port and two other ports, and pipes connecting the latter two ports with the inflaters of the respective teat cups, said valve being operable by said vacuum waves to connect the air port alternately with the other two ports and to connect the last named two ports alternately with a partial vacuum.

17. In a milking machine, the combination with two double chambered teat cups, of a pipe line, means to produce alternate high and low vacuum waves therein, and means controllable by said vacuum waves to communicate pneumatic pulsations to the inflaters of the two teat cups alternately.

18. In a milking machine, the combination with two double chambered teat cups, of a pipe line, means to produce alternate high and low vacuum waves therein, a valve the operation of which is controlled by said vacuum waves, and ports and passages coöperating with said valve to communicate pneumatic pulsations to the inflaters of the two teat cups alternately.

19. In a milking machine, the combination with two double chambered teat cups, of a pipe line, means to produce alternate high and low vacuum waves therein, and means controllable by said vacuum waves to admit air to the inflater of one teat cup while exhausting air from the inflater of the other and vice versa.

20. In a milking machine, the combination with two double chambered teat cups, of a pipe line, means to produce alternate high and low vacuum waves therein, a valve the operation of which is controlled by said vacuum waves, and ports and passages coöperating with said valve to admit air to the inflater of one teat cup while exhausting air from the inflater of the other and vice versa.

21. In a milking machine, the combination with two teat cups each having a teat chamber and an inflation chamber, of a pipe line, means to produce pneumatic pulsations in the pipe line, a milk pail in communication with the teat chambers of the teat cups, a connection, including a check valve, between the milk pail and the pipe line, and a valve controllable by said pneumatic pulsations and adapted in its movements to connect the inflation chamber of one cup with the pipe line and that of the other cup with the atmosphere and alternately therewith to connect the inflation chamber of the first cup with the atmosphere and that of the second cup with the pipe line.

22. In a milking machine, the combination with two teat cups each having a teat chamber and an inflation chamber, of a pipe line, means to produce vacuum waves in the pipe line, a milk pail in communication with the teat chambers of the teat cups, a connection, including a check valve, between the milk pail and the pipe line, and a valve controllable by said vacuum waves and adapted in its movements to connect the inflation chamber of one cup with the pipe line and that of the other cup with the atmosphere and alternately therewith to connect the inflation chamber of the first cup with the atmosphere and that of the second cup with the pipe line.

23. In a milking machine, the combination with a pipe line and means to create vacuum waves therein, of a milk pail, a connection, including a check valve, between the milk pail and the pipe line, two double chambered teat cups, a milk discharge from the inner teat chambers thereof to the milk pail, a valve connected with the pipe line and controllable by the vacuum waves therein, and ports and passages coöperating with the valve to admit air to the inflater chamber of one teat cup while exhausting air from the inflater chamber of the other teat cup and vice versa.

24. In a milking machine, the combination with two double chambered teat cups, of a pipe line and means to create vacuum waves therein, a milk pail, a connection, including a relatively light check valve, between the milk pail and the pipe line, a vacuum chamber, a connection, including a loaded check valve, between the vacuum chamber and the pipe line, a valve cylinder having one end in communication with the pipe line and the other end in communication with the vacuum chamber, a valve piston movable in the cylinder, and ports and passages coöperating with the valve to admit air to the inflation chamber of one teat cup while exhausting it from the other and vice versa.

25. In a milking machine, the combination with two double chambered teat cups, of a pipe line and means to create vacuum waves therein, a milk pail, a connection, including a relatively light check valve, between the milk pail and the pipe line, a vacuum chamber, a connection, including a loaded check valve, between the vacuum chamber and the pipe line, a valve chamber having one end in communication with the pipe line and the other end in communication with the vacuum chamber, a valve piston movable in the cylinder, and ports and passages coöperating with the valve to connect one inflation chamber alternately with air and with the vacuum chamber and the other inflation chamber alternately with air and directly with the pipe line.

26. In a milking machine, the combination with a pipe line and means to create vacuum waves therein, of a vacuum chamber, a connection, including a loaded check valve, between the pipe line and the vacuum chamber whereby a vacuum may be created in the latter of a degree between the two degrees of vacuum produced by the vacuum wave, a valve one end of which is open to the pipe line while the other end is open to the vacuum chamber, whereby the valve is reciprocated, two double-chambered teat cups, and ports and passages connected therewith and coöperating with the valve to admit air to the inflation chamber of one teat cup while exhausting air from the inflater chamber of the other teat cup and vice versa.

27. In a milking machine, the combination with two double-chambered teat cups and a milk discharge from the inner chambers thereof, of a pipe line, means to produce pneumatic pulsations therein and to communicate suction to the milk discharge, and means controlled by said pneumatic pulsations to admit air to the inflation chamber of one cup while exhausting air from the inflation chamber of the other independently of the milk discharge, and vice versa.

28. In a milking machine, the combination with two double-chambered teat cups and a milk discharge from the inner chambers thereof, of a pipe line, means to produce pneumatic pulsations therein and to communicate suction to the milk discharge, a valve connected with, and whose operation is controlled by the pulsations in, said pipe line, and ports and passages coöperating with said valve to admit air to the inflation chamber of one cup while exhausting air from the inflation chamber of the other cup independently of the milk discharge, and vice versa.

29. In a milking machine, the combination with two double-chambered teat cups, a milk pail, and a milk discharge from the inner teat cup chambers to the pail, of a pipe line, means to produce pneumatic pulsations therein and to communicate suction to the pail, a valve connected with, and whose operation is controlled by the pulsations in, said pipe line, and ports and passages coöperating with said valve to admit air to the inflation chamber of one cup while exhausting air from the inflation chamber of the other cup independently of the pail and the milk discharge, and vice versa.

30. In a milking machine, the combination with two double-chambered teat cups, a milk pail, and a milk discharge from the inner teat cup chambers to the pail, of a pipe line, means to produce pneumatic pulsations therein and to communicate suction to the pail, a valve connected with, and whose operation is controlled by the pulsations in, said pipe line, and ports and passages coöperating with said valve to admit air to the inflation chamber of one cup while exhausting air from the inflation chamber of the other cup into the pulsation line independently of the pail and the milk discharge, and vice versa.

In testimony of which invention, I have hereunto set my hand, at Poughkeepsie, N. Y., on this 13 day of Nov., 1915.

MEREDITH LEITCH.